United States Patent
Piggott et al.

(10) Patent No.: US 7,860,601 B2
(45) Date of Patent: Dec. 28, 2010

(54) PROFILE CHARACTERIZATION

(75) Inventors: David C. Piggott, Lakefield (CA); Andy Chik Hung Wong, Toronto (CA)

(73) Assignee: Quickmill, Inc., Peterborough, ON (CA)

( * ) Notice: Subject to any disclaimer, the term of this patent is extended or adjusted under 35 U.S.C. 154(b) by 449 days.

(21) Appl. No.: 12/000,563

(22) Filed: Dec. 13, 2007

(65) Prior Publication Data

US 2008/0161961 A1    Jul. 3, 2008

Related U.S. Application Data

(60) Provisional application No. 60/874,949, filed on Dec. 15, 2006.

(51) Int. Cl.
*G06F 19/00* (2006.01)
*G06K 9/00* (2006.01)
*G01C 9/00* (2006.01)

(52) U.S. Cl. .................... 700/175; 700/87; 700/114; 700/160; 700/192; 700/193; 700/195; 702/150; 382/152

(58) Field of Classification Search .................. 700/87, 700/108, 114, 159, 160, 161, 163, 174–175, 700/177, 178, 181, 185, 186, 192, 193, 195; 702/150, 170–172; 382/141, 146, 147, 151, 382/152

See application file for complete search history.

(56) References Cited

U.S. PATENT DOCUMENTS

| 4,576,546 | A | * | 3/1986 | Copper et al. ............. 414/744.6 |
| 4,596,037 | A | * | 6/1986 | Bouchard et al. ........... 382/141 |
| 5,125,035 | A | * | 6/1992 | McCarthy et al. ........... 382/141 |
| 5,288,209 | A | * | 2/1994 | Therrien et al. ......... 416/193 R |
| 5,771,309 | A | * | 6/1998 | Yamaoka et al. ............ 382/152 |
| 6,380,512 | B1 | * | 4/2002 | Emer .................... 219/121.71 |
| 6,606,539 | B2 | | 8/2003 | Raab |
| 6,819,974 | B1 | * | 11/2004 | Coleman et al. ............ 700/195 |
| 2003/0059268 | A1 | | 3/2003 | Zimmermann et al. |
| 2005/0043849 | A1 | | 2/2005 | Coleman et al. |

FOREIGN PATENT DOCUMENTS

WO    WO 99/10136    3/1999

* cited by examiner

*Primary Examiner*—Sean P Shechtman
(74) *Attorney, Agent, or Firm*—Dowell & Dowell, PC

(57) ABSTRACT

A system and method are disclosed for quickly characterizing the profile of a surface of a processed workpiece using a non-contact scanner, such as a laser scanner, in preparation for subsequent machining. The method determines the location of a plurality of features of a processed workpiece on a machine tool, and includes steps of reading a first list of approximate feature locations, defining a scan path based on the first list, scanning a profile of the workpiece along the scan path and calculating an actual location of each feature of the plurality of features based on the profile. The system and method are well suited to determine the location of features such as holes in welder header boxes.

13 Claims, 6 Drawing Sheets

PROFILE CHARACTERIZATION

CROSS-REFERENCE TO RELATED APPLICATIONS

The entire subject matter of U.S. Provisional application Ser. No. 60/874,949 filed Dec. 15, 2006 and entitled PROFILE CHARACTERIZATION incorporated herein by reference. The applicant claims priority benefit under Title 35, United States Code, Section 119 of U.S. Provisional application Ser. No. 60/874,949 filed Dec. 15, 2006 and entitled PROFILE CHARACTERIZATION.

TECHNICAL FIELD

The present invention relates to machine tools and more specifically to a laser scanning system for a computer numerical control (CNC) machine tool for characterizing the profile of a workpiece in preparation for machining.

BACKGROUND OF THE INVENTION

Header boxes for the heat exchange industry are typically constructed from steel plate welded to form a box. Front and back plates are drilled to accommodate heat exchange tubes. The welding and subsequent annealing processes typically distort the front and back plates. After the header box is welded further machining is required to finish the holes. This includes boring, spot facing, grooving, chamfering and tapping in order to accept a tube on one side and a plug on the other side. The welded header boxes can be machined manually by radial drilling using high speed steel tools which is very labor intensive. As an example a header box with 540 holes typically takes twelve hours to machine on a radial drill.

CNC machines using carbide tools can work much faster than a manual radial drill but require accurate location information for each hole. Even if the holes were originally bored on a CNC machine, because the welding process distorts the plates, the hole locations must be a re-determined. This is typically done by probing each hole with a ruby tipped measurement probe. Probing is performed on the CNC machine but is typically very slow, it requires positioning the delicate probe tip inside each hole and moving it in four directions until the probe contacts the side of the hole, taking care not to damage the probe tip. The probe must be centered in each hole and the X axis and Y axis limits measured. This can add five hours to the machining time for a 540 hall header box, negating much of the time savings in using a CNC machine.

Accordingly, a method and system for quickly and accurately determining the location of holes in a welded header box, remains highly desirable.

SUMMARY OF THE INVENTION

It is therefore an object of the present invention to provide an improved method for characterizing the profile of a surface of a workpiece on a machine tool.

Accordingly, an aspect of the present invention provides a method of determining the location of a plurality of features of a workpiece on a machine tool. The method comprising the steps of: reading a first list of approximate feature locations; defining a scan path based on the first list; scanning a profile of the workpiece along the scan path; and calculating an actual location of each feature of the plurality of features based on the profile.

In some embodiments, the scan path traverses each feature twice.

In some embodiments, the method further comprises a step of generating a second list of actual feature locations.

In some embodiments, the first list comprises a first computer numerical control (CNC) program.

In some embodiments, the second list comprises a second CNC program.

In some embodiments, the step of generating the second CNC program comprises steps of: reading the first CNC program; and modifying the first CNC program to replace approximate feature locations with actual feature locations.

In some embodiments, the plurality of features is arranged in a regular pattern.

In some embodiments, the method further comprises steps of: monitoring the profile for a measurement of an attribute of each the feature; and modifying the scan path responsive to each the measurement.

In some embodiments, the features are holes in a surface of the workpiece.

In some embodiments, the features comprise a surface profile of a surface of the workpiece.

In some embodiments, the surface profile comprises one or more changes in dimension of the surface.

In some embodiments, the scanning step is performed by a non-contact scan head.

In some embodiments, the method further comprises a step of flagging features having a measured parameter deviating from an expected value by more than a predefined acceptable tolerance.

In some embodiments, the machine tool is a milling machine.

In some embodiments, the milling machine is a gantry milling machine.

In some embodiments, the workpiece comprises a heat exchange header box.

In some embodiments, the first CNC program is a drilling program for a heat exchange header blank, and the workpiece comprises a heat exchange header distorted by a welding process.

Another aspect of the present invention provides a milling machine configured to carry out the process above.

A further aspect of the present invention provides a computer numerical control (CNC) milling machine comprising: means for reading a first list of approximate feature locations; means for defining a scan path based on the first list; means for scanning a profile of the workpiece along the scan path; and means for calculating an actual location of each feature of the plurality of features based on the profile.

In some embodiments, the means for defining a scan path comprises a first computer.

In some embodiments, the means for scanning a profile of the workpiece along the scan path comprises a non-contact scanner head.

In some embodiments, the means for scanning a profile of the workpiece along the scan path further comprises a real-time controller to receive scan signals from the scanner head.

In some embodiments, the scanner head comprises a laser scanner.

Yet another aspect of the present invention provides a kit for a scanning system for a CNC machine. The kit comprises a reading means for reading a first list of approximate feature locations, a defining means for defining a scan path based on said first list, a scanning means for scanning a profile of said workpiece along said scan path and a calculating means for calculating an actual location of each feature of said plurality of features based on said profile.

In some embodiments, the defining means for defining a scan path comprises a first computer.

In some embodiments, the scanning means for scanning a profile of said workpiece along said scan path comprises a non-contact scanner head.

In some embodiments, the scanning means for scanning a profile of said workpiece along said scan path further comprises a real-time controller to receive scan signals from said scanner head.

In some embodiments, the scanner head comprises a laser scanner.

BRIEF DESCRIPTION OF THE DRAWINGS

Further features and advantages of the present invention will become apparent from the following detailed description, taken in combination with the appended drawings, in which.

It will be noted that, throughout the appended drawings, like features are identified by like reference numerals.

DETAILED DESCRIPTION OF THE PREFERRED EMBODIMENT

Figure 1A:
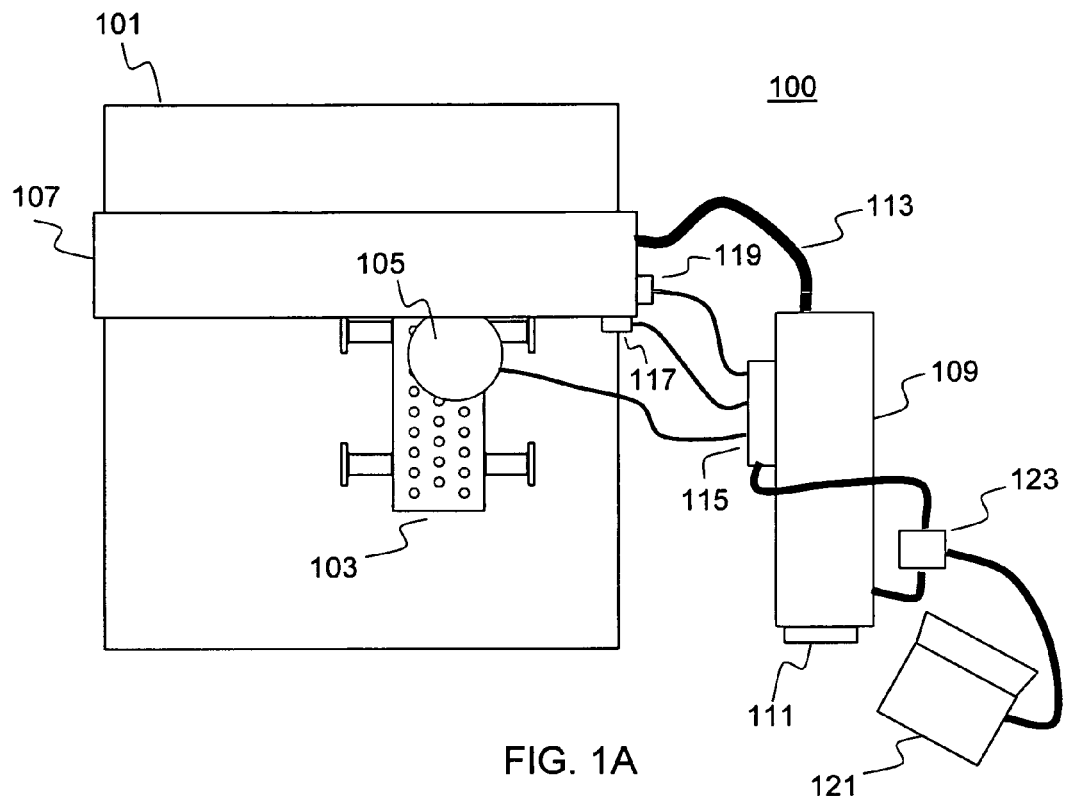
FIG. 1A is a plan view of an embodiment of scanning system of the present invention.
Figure 1B:
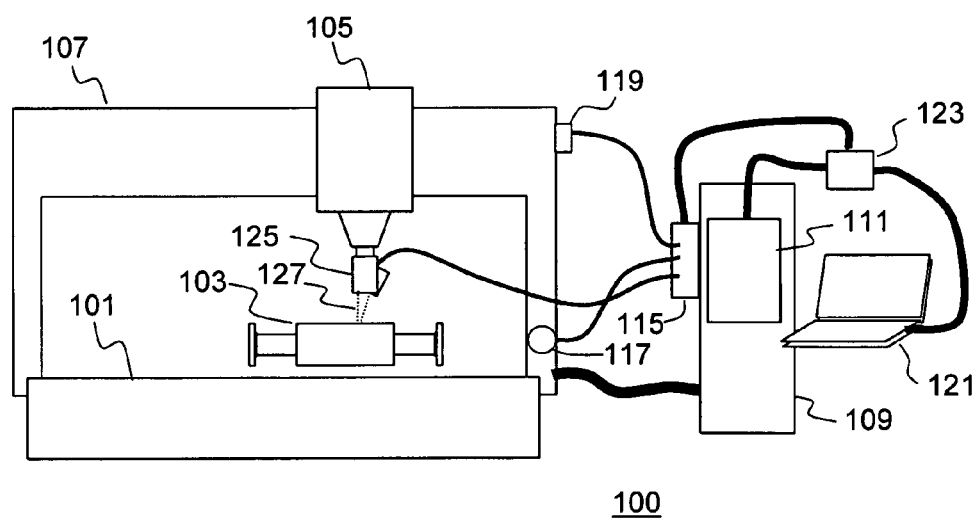
FIG. 1B is an elevation view of the embodiment of FIG. 1A.

FIGS. 1A and 1B illustrate an embodiment of a scanning system 100 of the present invention. The scanning system 100 provides a laser scanning system for a CNC machine tool. The CNC machine tool has a bed 101 for holding a workpiece 103, illustrated here as a welded heat exchange header box. A machine spindle 105 is supported and positioned by gantry 107, under the control of CNC controller 109, having operator control panel 111. The CNC controller 109 is connected to the machine tool by control and power cable 113. For the scanning process, a laser scanning head 125 (visible in FIG. 1B) is mounted in the machine spindle 105. The CNC machine is used to move the laser scanning head 125.

A real-time embedded controller 115 captures measurement signals from the laser scanning head 125 and X-axis encoder 117 and Y-axis encoder 119. The real time embedded controller 115 has a 16-bit analog-to-one digital converter (ADC) for converting the analog signals from the laser scanning head to digital format; 16-bit quadrature decoders for converting the signals form the X- and Y-axis quadrature encoders 117, 119; a flash memory for storing the scanning data as it is collected; an input/output section for interfacing with the CNC controller; and a CPU for controlling the above. An exemplary memory size for storing the collected measurements is 480 MB, although 16 MB would be sufficient for most applications. The X and Y-axis encoders 117, 119 capture accurate position information of the bridge 107, machine spindle 105 and by extension, the laser scan beam 127 of laser scanning head 125. The signals are captured in real time so that a "Z" axis reading from the laser scan head 125 can be correlated to corresponding X and Y-axis readings. The laser scanner head 125 is a displacement sensor that measures of the distance between the laser head 125 and the surface of the workpiece 103. The embedded controller 115 captures the analog voltage output of the laser scanning head 125 and converts it to a digital representation. The encoders 117, 119 are quadrature encoders which output a digital signal which is calibrated and counted by the embedded controller 115.

The scanning system 100 further has a computer 121 for file manipulation, and control of the scanning system and for performing required calculations. The computer 121 in this embodiment is a laptop computer to take advantage of the integrated packaging and for space considerations. It can be mounted on a frame attached to the CNC controller 109 and can be folded out of the way when it is not in use.

The computer 121 interfaces to the CNC controller 109 and the embedded controller 115 via a computer network. In this case a USB hub 123 is used to provide the network. The computer 121 and/or the CNC controller 109 can also be connected to a server (not shown) for storing programs using the same network or a different network such as a local area network. If the CNC controller 109 and the embedded controller 115 have RS232 serial interfaces, these can be converted to USB signals with a simple USB/RS232 converter well known in the art.

Figure 2:
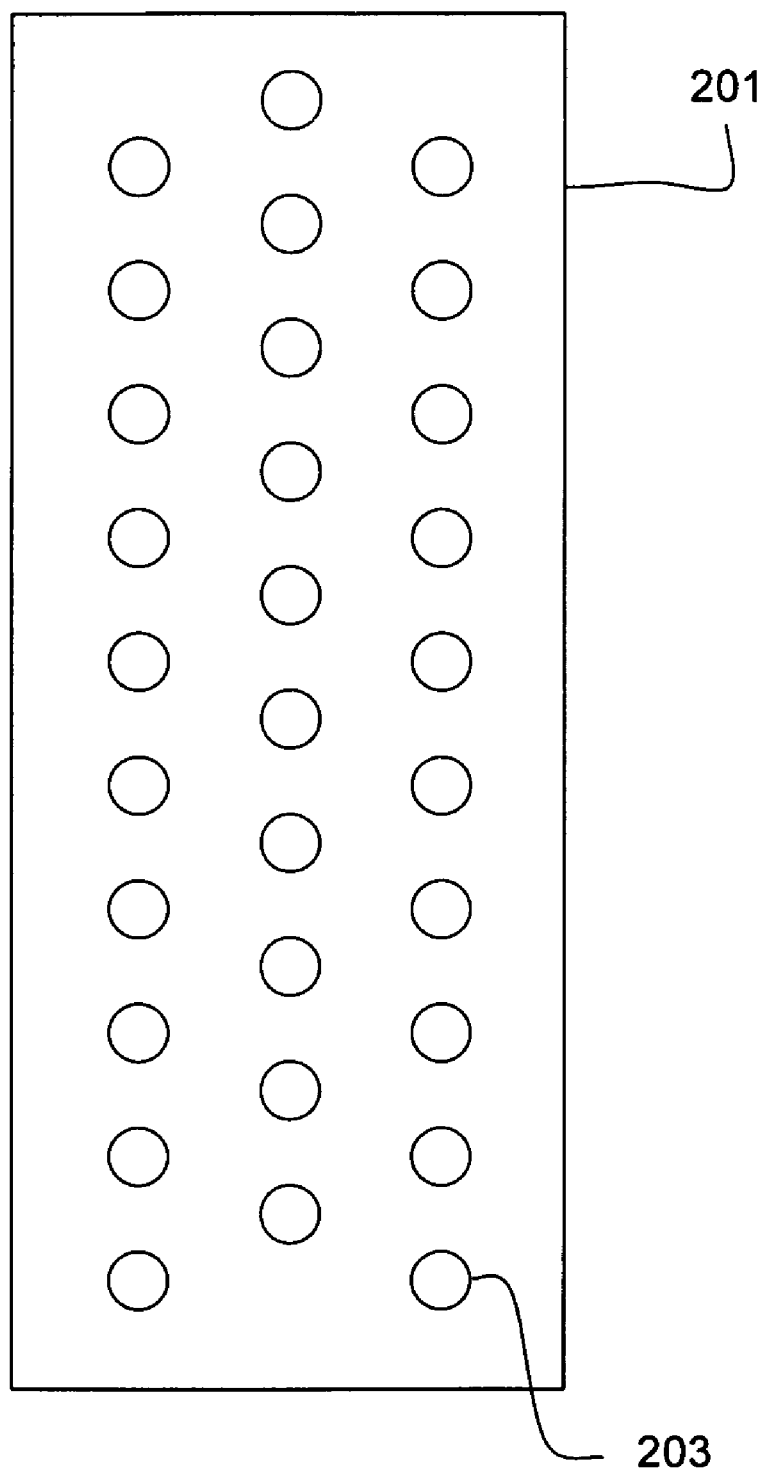
FIG. 2 is an exemplary illustration of a header box top plate machined by a CNC machine.

In the process of manufacturing a plate-steel heat exchange header box, an array of holes 203 (to accept heat exchange tubes) are drilled in a top plate 201 and a matching bottom plate, on a CNC machine using a first CNC program. An exemplary top plate 201 with holes 203, is shown in FIG. 2. The header box assembly 103 is then welded, with coupling flanges and is heat treated or annealed. These welding and heat treating processes distort the top plate 201 which was originally flat. The holes 203 are typically out of round, the plate becomes warped and the location of each hole is shifted such that the hole locations in the first CNC program are no longer representative of the actual location of the holes. In order not to compromise machining tolerances, the actual location of the distorted holes should be established before CNC machining is performed.

Figure 3:
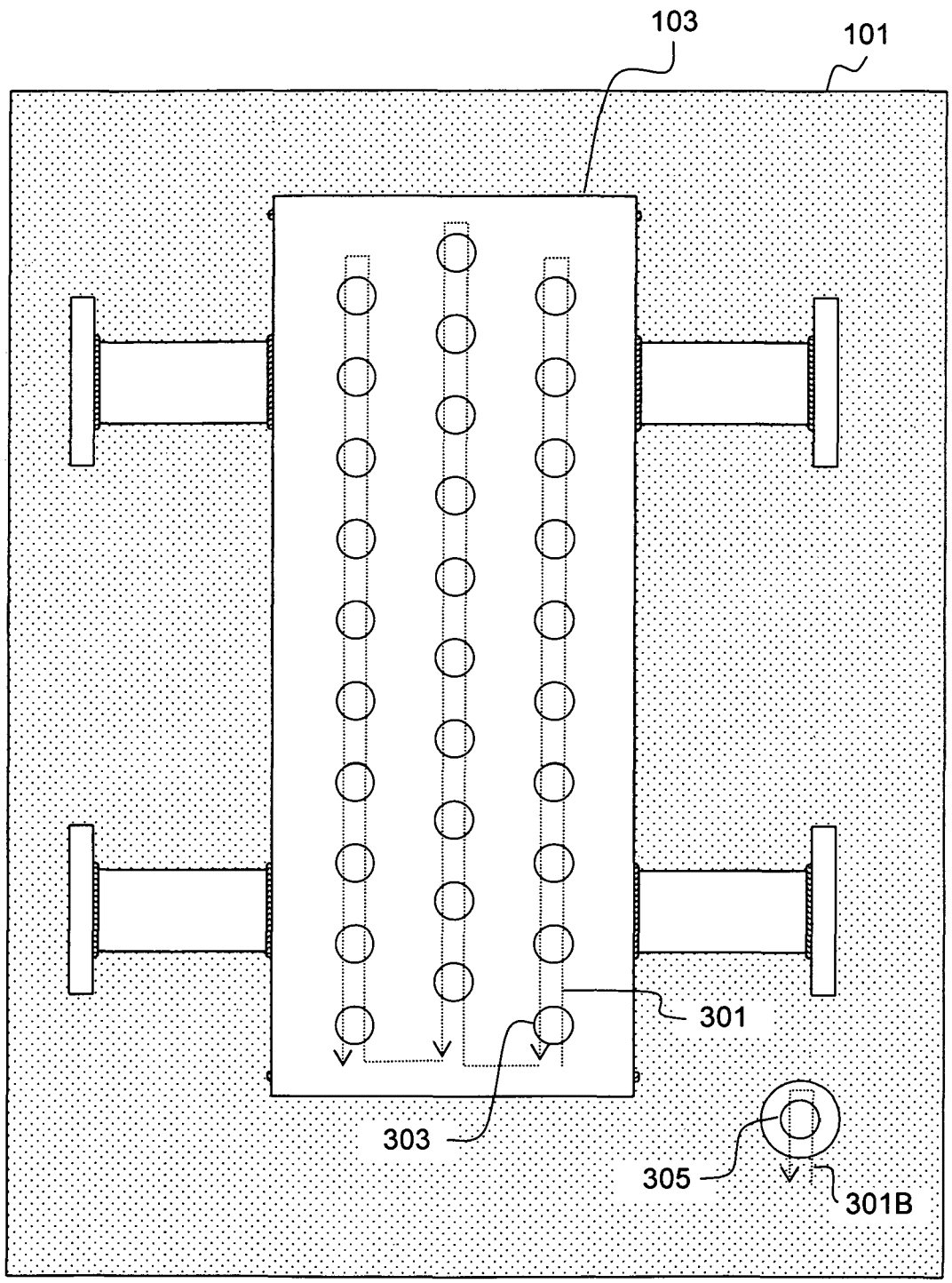
FIG. 3 is an exemplary illustration of a welded header box using the top plate of FIG. 2. mounted on a machine tool table and showing exemplary laser scan paths.

The welded header box 103 is mounted on the CNC bed 101 as shown in FIGS. 1A and 1B. In general terms, the scanning system 100 uses the first CNC program as a basis for developing a second CNC program to move the laser scanning head through a scan path 301 (as shown in FIG. 3) which intersects each hole in turn. The scan path follows each row of holes, scanning to one side of the center of each hole in a first path and then scanning to other side of the center of each hole on the return path. Subsequent rows of holes are scanned in a similar manner. The scanning head measures a vertical position of a surface and can therefore be used to detect the hole edge along the scan path. The real-time embedded controller 115, captures the X position, Y position and vertical or "Z" position at each hole edge. This process therefore results in identifying a position in three dimensions, of four points along the circumference of each hole.

Figure 4:
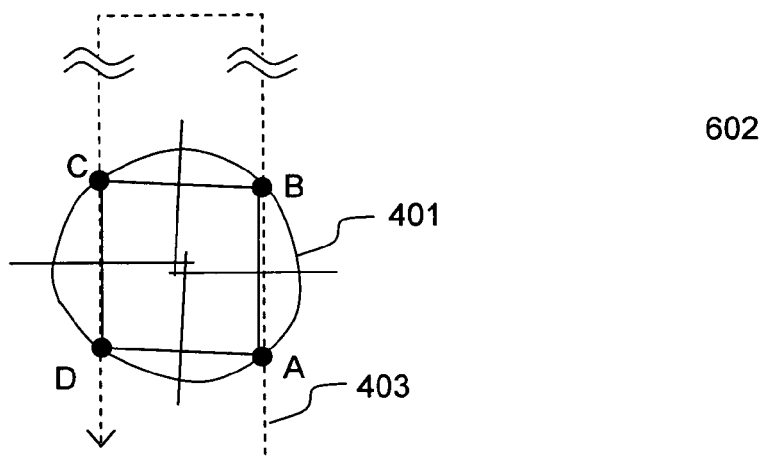
FIG. 4 illustrates scan path detail of an exemplary distorted hole and resulting calculated hole centers.
Figure 5:
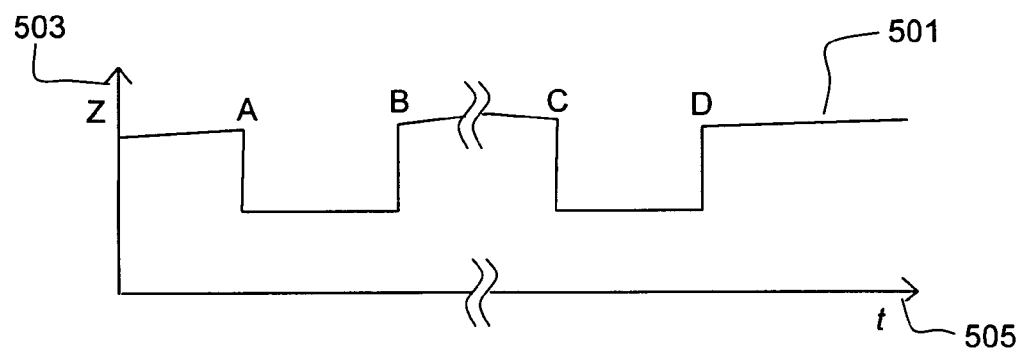
FIG. 5 illustrates a graph of an exemplary output waveform of a laser scan of the distorted hole of FIG. 4.

FIG. 4 illustrates an exemplary circumference of a distorted hole 401 with an exemplary scan path 403, defining four points A, B, C, D. An exemplary output signal 501 from scanner 125 is shown in FIG. 5 where the vertical axis 503 represents vertical position of the surface of the workpiece 103 as measured by scanner head 125, and the horizontal axis 505 of the graph indicates time. The points A, B, C, D where the vertical position changes instantaneously indicate the edges of the holes 203 along the scan path 403. The embedded controller 115 processes information received from the X- and Y-axis controllers 117, 119 and the laser scanning head 125; and determines and records the edge position of the holes along the scan path. By storing the X, Y and Z position of the upper edge, of the hole edge, the location of points along the hole edge of each hole is made available for subsequent calculation, by the computer 121, of the location of the center of each hole.

Mathematically, a circle can be defined by three points on its circumference. Having knowledge of four points on the circumference of a distorted hole, permits four separate calculations of a center of a true circle, using four groupings of three points (ABC, ABD, BCD, ACD), yielding respectively, points E, F, G, H. An average location of these four center calculations can provide a best estimate of the actual center of the distorted hole 401.

The actual location for all holes in the header box can thus be determined and this information can be used to update hole location for a CNC program to perform the various machining steps required to finish the holes in the header box such as: boring, spot facing, grooving, chamfering, and tapping.

The scanning process will now be described in more detail. To use the scanning system, the operator first turns on the CNC machine and then positions the spindle head 105 to a position to mount the laser scanning head 125. After ensuring that the embedded controller 115 is turned off, the operator mounts the laser scanning head 125 onto the spindle 105. The operator then turns on the embedded controller 115 and turns on the computer 121.

Figure 6:
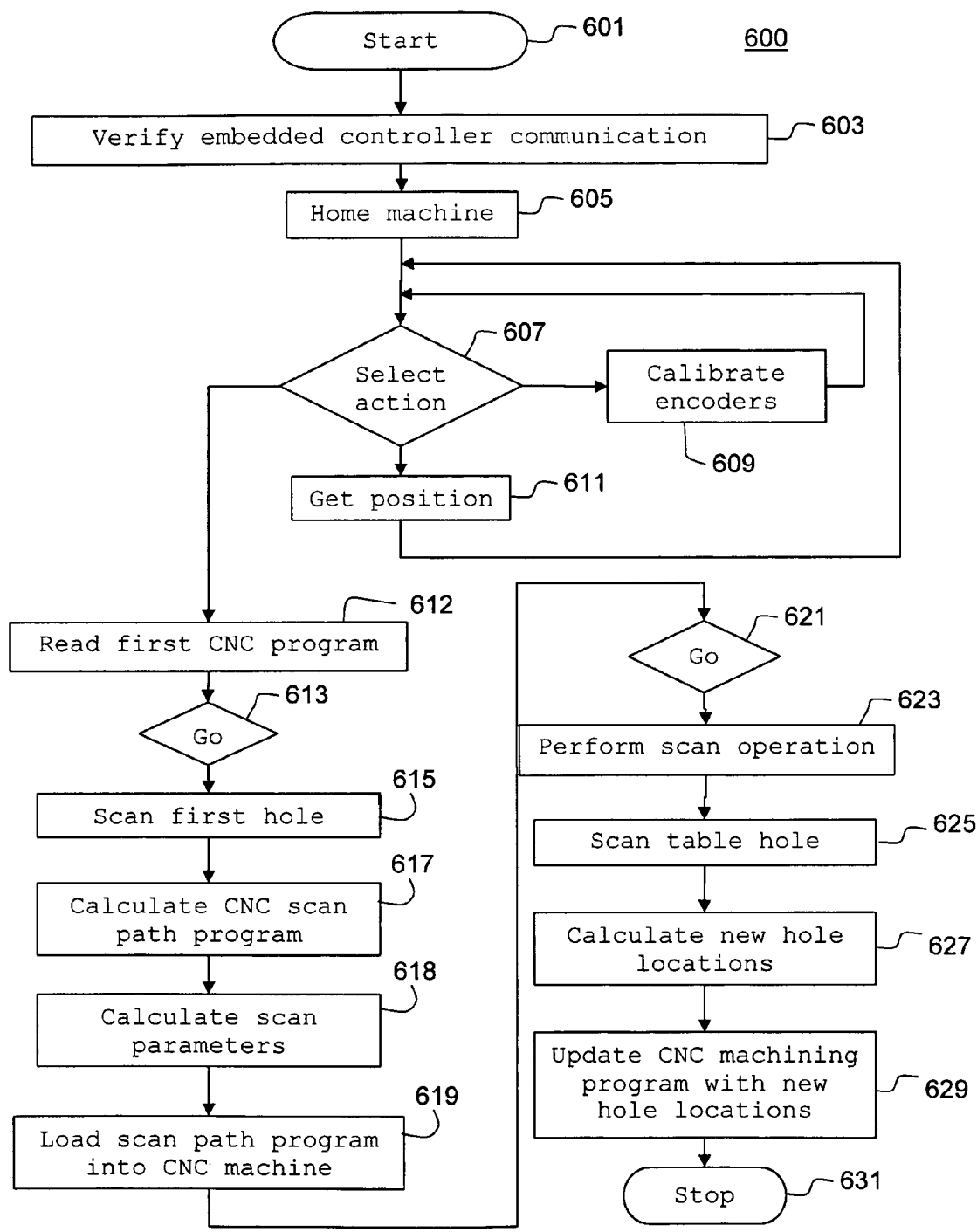
FIG. 6 illustrates a flowchart of the steps of an exemplary method of the present invention.

The laser scanning process 600 will be described with reference to the flowchart of FIG. 6. A laser scanning software program is loaded into the computer 121. This program supervises the process and provides the interface to the operator and the embedded controller 115. The process starts at 601. At step 603 the laser scanning program in the computer verifies communication with the embedded controller 115. Upon successful acknowledgement from the embedded controller, the program in the computer 121 instructs the operator to home the spindle head of the CNC machine at step 605. With the spindle head of the CNC machine at the zero-reference home position, the X- and Y-positions are set to zero in the computer 121. In one embodiment, the encoders 117, 119 output only 16 bits of data which does not cover the full range of movement of the spindle head in the X- and Y-planes of the CNC machine. The computer 121 therefore keeps track of rollover of the 16 bit counts to maintain an accurate count of the actual position.

At step 607 the computer waits in an idle state for the operator to select an action. Step 609 "calibrate encoders", is typically only selected during the initial installation of the scanning system onto the CNC milling machine. In step 609, the CNC machine is instructed to move a pre-determined distance in the X- and Y-planes, and the encoder counts from encoders 117 and 119 are measured and calibrated to correspond to the pre-determined distances. All subsequent encoder measurements are then converted to inches or millimeters by the computer 121.

Step 611 is periodically selected by the computer when in the idle state at step 607, to calculate a current position of the spindle head and display it on the screen of the computer 121.

From step 607, the scanning process is initiated by the operator. At step 612, the computer reads a first CNC program, used to bore the initial holes in the top plate 201 of welded header box 103. The first CNC program provides the original hole locations and the machine tool path between the holes. Typically, header boxes have holes arranged in a regular pattern of multiple rows as can be seen in FIG. 2. The scanning software of the computer parses the hole coordinates from the first CNC program and sorts the hole positions in to logical rows to facilitate scanning.

The operator manually positions the CNC machine spindle 105 so that the laser scan beam 127 of laser scanning head 125 is adjacent to the first hole 303 bored during the boring sequence of the first CNC program. The laser scan beam 127 is positioned in front of the first and roughly centered along the row of holes. The operator manually adjusts the height of the laser scanning head 125 to provide an output signal close to zero, that is, about the middle of the scanning range of +/−40 mm. The operator loads a "Scan First Hole" program into the CNC machine.

At step 613, the computer waits for operator input to start scanning the first hole at step 615. Once the operator initiates step 615, "Scan First Hole" program on the computer 121, the operator then starts the CNC "Scan First Hole" program on the CNC controller 109, whereby the laser scanning head 125 scans the first hole in a "U" shaped path 403 as shown in FIG. 4. The embedded controller 115 captures the readings from the laser scanning head 125, and the X-and Y-encoders 117, 119. The computer 121 the queries the embedded controller 109, and retrieves these readings to calculate the center and the diameter of the first hole using mathematical algorithms well known in the art. The CNC "Scan First Hole" program is configured to scan a predetermined nominal hole size. Optionally, the hole size to scan can be determined by modifying the CNC program or by the computer program querying the operator for a hole size to scan. For example, to scan holes approximately one inch in diameter, the "U" shaped scan path will scan approximately along a center line of the hole from approximately 0.3 inch before the hole to approximately 0.3 inch past the hole, then shift to one side by approximately 0.3 inch and return to scan the hole edge again on a return leg of the "U" shaped scan path.

At step 617, the computer 121 calculates the scan path all of the holes of the workpiece 103 using the approximate hole locations from the first CNC boring program to generate the original tool path and applying an offset of 85% of the radius of the first hole, as determined by the scan first hole process, so that a scan path is generated passing through each hole twice. Other offset values such as 75% could be used as well. The principle is to obtain sufficient spacing between measured edge locations around each hole to permit an accurate calculation of the center of each hole. The computer 121 then creates a CNC scan path program to move the laser scanning head 125 through the calculated scan path such that in a first pass along each row of holes, the scan traverses each hole to one side of the approximate center, offset by 85% of the radius and then in a second pass, offset by 85% of the radius to the other side of the approximate center of each hole.

A useful feature of the exemplary system is a feedback system to dynamically monitor scan parameters and adjust the scan path to compensate for drift in the row of holes, caused for example, by a slight distortion or curvature in the row of holes or skewed mounting of the workpiece 103. At step 618, the computer 121 calculates scan parameters, namely a reference chord length for the scan path through each hole, derived from scan measurements of the first hole. Referring to FIG. 4 and FIG. 5, the chord lengths are shown as A-B and C-D. The chord length provides an indication of the accuracy of the scan path. If during the scanning process, the chord length for holes tends to increase or decrease, it is an indication that the scan path is offset by less than or more than, respectively, the nominal offset of 85% of the radius. Thus at step 618, the computer calculates a reference chord length and communicates the reference chord length along with acceptable minimum and maximum values of chord length, to the embedded controller 115.

At step 619, the operator loads the CNC scan program created at step 617 from the computer into the CNC controller 109.

At step 621, the operator initiates the scanning process by starting the scanning program on the computer 121, which in turn instructs the embedded controller 115 to start a scan monitoring program in embedded controller 115 which captures measurements in real-time as well as providing a feedback mechanism to adjust the scan path dynamically. The computer 121 then instructs the operator to start the CNC scanning program on the CNC controller 109.

At step 623, the scan operation is performed. The CNC scanning program moves the laser scanning head 125 through the scan path 301, intersecting each hole on each row once on each of two passes. The embedded controller 115 captures X-axis, Y-axis, and scanning head output in real time. The embedded controller 115 measures the edges of the holes by detecting the sharp transitions in the output signal as shown in FIG. 5, which correspond to the transition from a surface to hole or from a hole to a surface. The top edge of the output signal also indicates the height (Z-axis) of the edge of the hole. The embedded controller 115 then stores the X, Y and Z positions of each such hole edge, in flash memory for later access by the computer 121. When the embedded controller 115 detects a hole edge that is a transition from the hole to a surface, it calculates the chord length across the hole that was just scanned. The embedded controller 115 then compares the chord length to the minimum and maximum acceptable chord lengths as provided by the computer 121 at step 618. If the chord length is less than the minimum, the embedded controller sends a command to the CNC controller 109, to adjust the scan path closer toward the center line of the hole. Thus if the scan path is in the +X direction and the offset from the centerline is in the −Y direction, the embedded controller 115 sends a command to the CNC controller 109 to move the scanning head incrementally in the +Y direction. Similarly, if the chord length is greater than the maximum, the embedded controller sends a command to the CNC controller 109, to adjust the scan path farther from the center line of the hole.

When all the holes are scanned, at step 625 the computer scan program instructs the CNC controller 109 to scan the table hole 305 along table hole scan path 301B. The table hole 305, is in a reference piece mounted on the machine tool bed 101 in a predetermined fixed location. In the example shown in FIG. 3, the table hole has a nominal hole diameter comparable to the holes 303 in the workpiece 103.

At step 627, the computer 121 polls the embedded controller for the stored X, Y and Z position data for each hole edge, including those of the table hole 305 to the computer 121. The computer 121 calculates the center of each hole in the workpiece 103, and the table hole 305. The hole center calculations are performed on the measured locations as discussed previously with reference to FIG. 4, using mathematical algorithms well known in the art. These calculations are performed four times for each hole, using three of the four hole edge locations for each calculation. The average of these four calculations is used as the calculated hole center. An average of the vertical location of each hole edge is also calculated. The calculated center position of the table hole 305 is compared to its predetermined known location and this offset is applied to the calculated center positions of the holes in the workpiece 103 to compensate for the position of the laser beam relative to the spindle center.

At step 629, the computer 121 reads in the original CNC boring program and replaces the original hole coordinates with the newly calculated hole locations. The original program is also modified to add vertical position (Z-axis) information for each hole, using the calculated average vertical position for each hole. The modified CNC hole boring program can then be used to refinish the previously bored holes to correct for distortions caused by welding and heat treating processes. If other finishing process steps are to be performed on the workpiece 103, the computer 121 can read appropriate previously created CNC machining programs to perform finishing steps such as boring, spot facing, grooving, chamfering, and tapping. These CNC programs are then similarly modified using the newly calculated hole locations to replace the original hole coordinates.

The scanning process stops at step 631.

In another embodiment, the program of computer 121 can optionally flag holes having measured parameters deviating from an expected value by more than a predefined acceptable tolerance. The computer 121 can accept operator input for acceptable tolerances for parameters such as: hole diameter, "X" pitch; "Y" offset and "Z" offset. Any holes having measured parameters with values deviating from the operator defined acceptable tolerance compared to an expected value. The expected value can be a hole size or location as determined by the average measured values of all of the holes or features, will be flagged to the operator. It is understood that other expected values could be flagged in this manner, such as for example, the original hole location s as defined by the original CNC boring program. The flagging can be communicated to the operator by identifying the holes by number, relative position on the workpiece, by graphically displaying the flagged holes or other suitable means. It is understood that features other than holes can be flagged in such a manner, such as surface profiles, ridges, slots, etc.

The exemplary embodiments described above relates to measuring of holes in a workpiece. It will be apparent to those skilled in the art that the present invention can also be used to measure other features of a workpiece such as for example, but not limited to: edges, slots, protrusions or surface profile, which are capable of being measured for the purpose of subsequent machining or processing by a CNC controlled tool such as for example but not limited to: milling machine, lathe, cutting machine, grinding or polishing machine.

Figure 7:
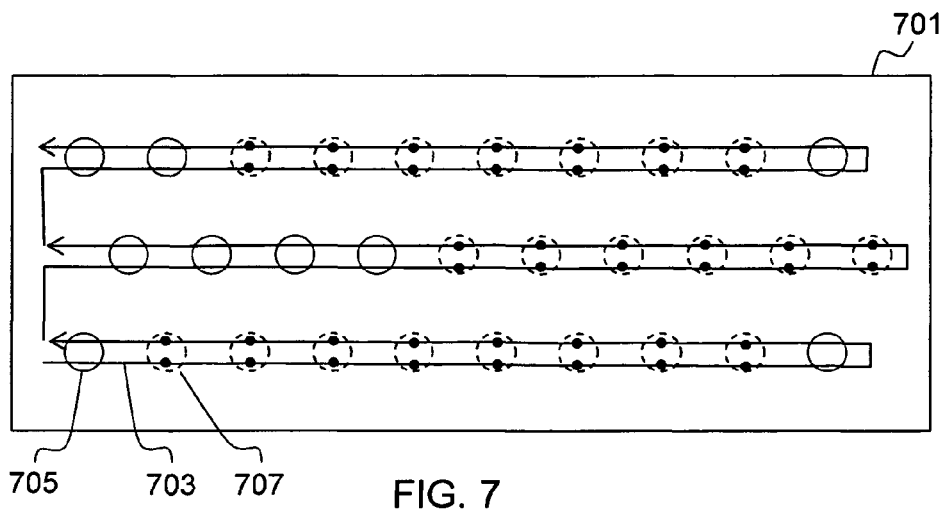
FIG. 7 illustrates an exemplary scan path for a partially drilled workpiece.
Figure 7A:
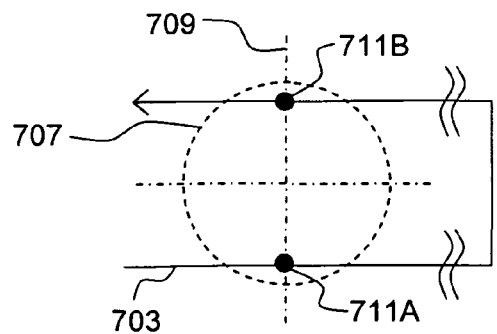
FIG. 7A illustrates exemplary scan path detail for an a partially drilled workpiece in an area where a hole has not yet been drilled.

In another exemplary embodiment, the system can be set up to scan a workpiece 701 as shown in FIG. 7 and in more detail in FIG. 7A, in which only subset of holes 705 of the original CNC boring program have been bored, and other holes 707 have not yet been bored. In this embodiment, the system can follow a calculated scan path 703 as calculated at step 617 and where the theoretical hole location is noted and "Z" or vertical measurements are captured at 711A and 711B along scan path 703 in the vicinity of a theoretical centre line 709 perpendicular to the scan path 703. Thus when scanning an area where a hole is not yet bored, the "Z" location can be captured to aid in future machining operations. In this embodiment, the computer 121 reads in a first CNC program with all of the planned holes and a further CNC program with only the holes that have been bored. The computer 121 parses the two CNC programs, determines the theoretical location for future holes and stores the location information and sends this information to the embedded controller 115. During the scan operation, the embedded controller 115, captures hole edge information for existing holes 705 as described above, and additionally, where the scan path traverses an area of a future hole 707, the embedded controller records and stores "X", "Y", and "Z" data at locations 711A and 711B. The "Z" or vertical location data of points 711A and 711B are averaged to produce a practical indication of the vertical position of the center of future hole 707.

Figure 8:
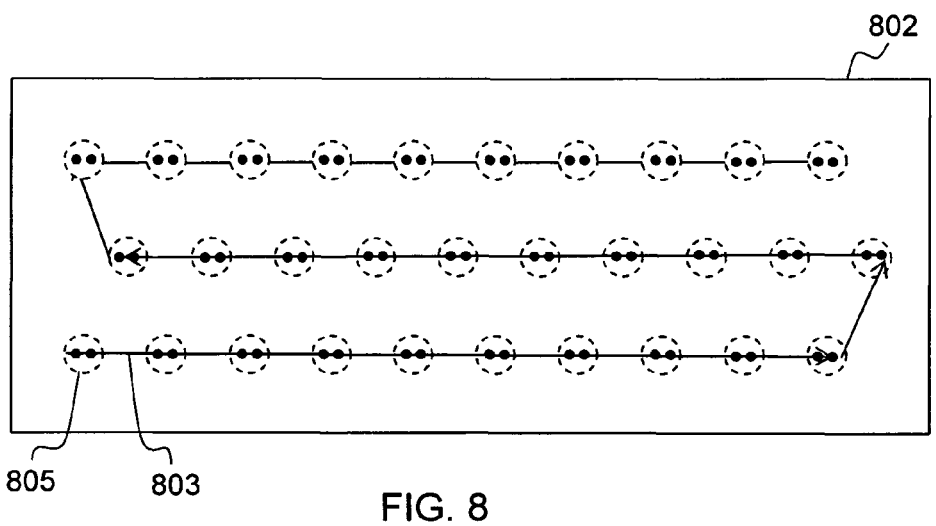
FIG. 8 illustrates an exemplary scan path for a workpiece before holes are drilled.
Figure 8A:
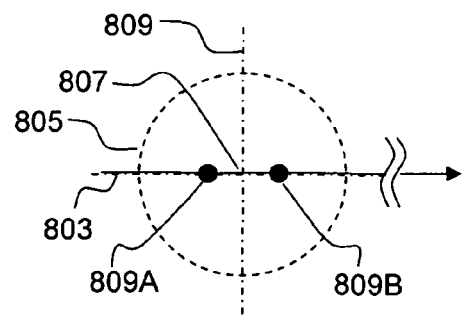
FIG. 8A illustrates exemplary scan path detail for a workpiece before holes are drilled.

In another exemplary embodiment, the system can be set up to scan a surface profile of workpiece 802 before the holes are bored, as illustrated in FIG. 8 and in more detail in FIG. 8A. In this case there are no holes that need to be scanned and no centers need to be calculated and thus a simplified scan path 803 can be used. The "Z" or height profile is measured at the location of future holes 805, so that the CNC machining programs can be modified or fine-tuned to accommodate a wavy or distorted top surface of the workpiece. Thus, at step 617, the scan path is calculated to traverse the theoretical center 807 of each future hole 805 and to take a "Z" or height measurement at a position slightly before 809A and again slightly 809B after the theoretical center 807 of each future hole 805. At step 627, the two vertical position measurements taken at 809A and 809B for each hole are averaged to provide a useful indication of the vertical position of the top surface of the workpiece at the location of each hole.

The embodiment(s) of the invention described above is(are) intended to be exemplary only. The scope of the invention is therefore intended to be limited solely by the scope of the appended claims.

What is claimed is:

1. A method for characterizing the profile for each of a plurality of holes of a distorted processed workpiece following a processing step capable of distorting the workpiece, the method comprising:

providing a first list of approximate hole locations derived from a CNC program used for producing the holes of the distorted processed workpiece prior to processing and defining a first scan path;

relative to the processed workpiece, advancing a laser scanner head on a machine tool along the first scan path to determine two edge locations forming a first chord of a first hole;

storing values for the edge locations of the first hole;

determining a first chord length of the first hole;

comparing the first chord length of the first hole to a predetermined minimum and maximum chord value range and in the event that the first chord length is outside the predetermined minimum and maximum chord value range, incrementally adjusting the scan path accordingly;

relative to the processed workpiece, advancing a laser scanner head along the first scan path to determine two edge locations forming a first chord of a second hole in succession to the first hole;

storing values for the edge locations of the second hole;

determining a first chord length of the second hole;

comparing the first chord length of the second hole to the predetermined minimum and maximum chord value range and in the event that the first chord length of the second hole is outside the predetermined minimum and maximum chord value ranges, incrementally adjusting the first scan path accordingly;

relative to the processed workpiece, advancing the laser scanner head on the machine tool along the first scan path to determine two edge locations forming a first chord for each successive hole in the first scan path;

storing values for the edge locations for each successive hole along the first scan path;

determining a first chord length of each successive hole in the first scan path;

relative to the processed workpiece, advancing the scanner head along a second scan path to determine two edge locations forming a second chord of each successive hole in the first list along the second scan path;

storing values for the edge locations for each successive hole in the second scan path; and determining a second chord length of each successive hole in the first list in the second scan path;

with the first and second chord lengths for each hole, characterizing a center for each hole in the first list.

2. The method as defined in claim 1, further comprising before the advancing, orienting the first and second scan paths according to predetermined first and second offsets along a radius of a machine tool reference hole.

3. The method as defined in claim 2, further comprising determining a new location for each hole relative to a machine tool reference hole including:

determining the center of the reference hole; and comparing said center of the reference hole to a predetermined location so as to determine an offset for the new hole locations to compensate for the position for the laser scanner head; and updating the CNC program with the new hole locations to form a second list; and carrying out one or more finishing actions on the distorted workpiece according to the second list.

4. The method as defined in claim 1, wherein said first list comprises a first computer numerical control (CNC) program.

5. The method as defined in claim 3, wherein said second list comprises a second CNC program.

6. The method as defined in claim 1, wherein said plurality of holes is arranged in a regular pattern.

7. The method as defined in claim 1, wherein said method further comprises:

monitoring said profile for a measurement of an attribute of each said hole; and modifying said scan path responsive to each said measurement.

8. The method as defined in claim 1, further comprising determining if a measured parameter of the holes deviates from an expected value by more than a predefined acceptable tolerance.

9. The method as defined in claim 1, wherein said machine tool is a CNC milling or drilling machine.

10. The method as defined in claim 9, wherein said CNC milling or drilling machine is a gantry milling machine.

11. The method as defined in claim 9, wherein said workpiece comprises a heat exchange header box.

12. The method as defined in claim 11, wherein said first CNC program is a drilling program for a heat exchange header blank, and said workpiece comprising a heat exchange header distorted by a welding process.

13. A milling machine configured to carry out the process of claim 1.

* * * * *